(12) United States Patent
Thubert et al.

(10) Patent No.: US 12,425,371 B2
(45) Date of Patent: Sep. 23, 2025

(54) SYSTEM AND METHOD FOR PROVIDING SCHC-BASED EDGE FIREWALLING

(71) Applicant: Cisco Technology, Inc., San Jose, CA (US)

(72) Inventors: Pascal Thubert, Roquefort-les-Pins (FR); Jonas Zaddach, Antibes (FR); Patrick Wetterwald, Mouans Sartoux (FR); Eric Levy-Abegnoli, Valbonne (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 232 days.

(21) Appl. No.: 17/932,754

(22) Filed: Sep. 16, 2022

(65) Prior Publication Data

US 2024/0098063 A1  Mar. 21, 2024

(51) Int. Cl.
*H04L 9/40* (2022.01)

(52) U.S. Cl.
CPC ...... *H04L 63/0263* (2013.01); *H04L 63/0245* (2013.01); *H04L 63/029* (2013.01)

(58) Field of Classification Search
None
See application file for complete search history.

(56) References Cited

U.S. PATENT DOCUMENTS

| | | | | | |
|---|---|---|---|---|---|
| 3,914,319 | A | * | 10/1975 | Dear | C07C 321/00 562/556 |
| 4,154,984 | A | * | 5/1979 | Murasov | H04J 3/0605 370/510 |
| 4,443,451 | A | * | 4/1984 | Kennis | C07D 211/32 514/224.2 |
| 4,484,080 | A | * | 11/1984 | Kumagai | G01B 11/245 250/559.22 |
| 4,529,727 | A | * | 7/1985 | Kennis | C07D 211/32 514/224.2 |
| 4,548,938 | A | * | 10/1985 | Kennis | C07D 401/04 544/263 |
| 4,614,734 | A | * | 9/1986 | Smolanoff | C07F 9/2408 987/202 |
| 4,931,337 | A | * | 6/1990 | Miyazaki | G11B 7/244 430/394 |

(Continued)

FOREIGN PATENT DOCUMENTS

| | | | | |
|---|---|---|---|---|
| EP | 2748750 A1 | * | 7/2014 | ........ G06F 15/177 |
| EP | 3541041 B1 | * | 3/2022 | ........ H04L 63/0245 |
| KR | 1020100070613 A | | 6/2010 | |

OTHER PUBLICATIONS

Liu et al."Firewall Policy Queries," IEEE Transactions on Parallel and Distributed Systems, vol. 20, No. 6, pp. 766-777 (Year: 2009).*

(Continued)

*Primary Examiner* — Luu T Pham
*Assistant Examiner* — James J Wilcox
(74) *Attorney, Agent, or Firm* — Baker Botts L.L.P.

(57) ABSTRACT

In one embodiment, a method includes identifying, using a Static Context Header Compression (SCHC) rules engine, one or more packets matching a rule, selecting a firewall decision based on the identified one or more packets and the rule, and applying the firewall decision to the one or more identified packets.

11 Claims, 3 Drawing Sheets

(56) References Cited

U.S. PATENT DOCUMENTS

| | | | | |
|---|---|---|---|---|
| 4,957,916 A * | 9/1990 | Kennis | C07D 513/04 | 514/224.2 |
| 5,015,740 A * | 5/1991 | Kennis | C07D 231/56 | 544/371 |
| 5,100,766 A * | 3/1992 | Fukui | G11B 7/24 | |
| 5,196,425 A * | 3/1993 | Vandenberk | C07D 401/14 | 544/278 |
| 5,268,378 A * | 12/1993 | Baker | C07D 409/12 | 546/156 |
| 5,280,123 A * | 1/1994 | Nanjo | C07F 9/59 | 548/111 |
| 5,321,028 A * | 6/1994 | Vandenberk | C07D 471/04 | 514/259.2 |
| 5,410,354 A * | 4/1995 | Uz | H04N 19/587 | 375/E7.091 |
| 5,472,978 A * | 12/1995 | Baker | C07C 255/13 | 560/21 |
| 5,494,658 A * | 2/1996 | Hanel | A61Q 15/00 | 514/880 |
| 5,512,446 A * | 4/1996 | Miyazaki | C12Q 1/6816 | 435/7.1 |
| 5,572,492 A * | 11/1996 | Ogawa | G11B 7/245 | |
| 5,610,162 A * | 3/1997 | Witzel | C07J 73/005 | 546/77 |
| 5,687,362 A * | 11/1997 | Bhargava | G06F 16/24542 | |
| 5,758,256 A * | 5/1998 | Berry | H04W 88/181 | 455/72 |
| 5,843,735 A * | 12/1998 | Lee | C12N 9/0071 | 435/68.1 |
| 5,890,148 A * | 3/1999 | Bhargava | G06F 16/24542 | |
| 6,057,352 A * | 5/2000 | Brown | A01N 43/653 | 548/264.6 |
| 6,077,686 A * | 6/2000 | Der | C07K 14/4702 | 435/325 |
| 6,141,749 A * | 10/2000 | Coss | H04L 63/0236 | 713/162 |
| 6,154,775 A * | 11/2000 | Coss | H04L 9/40 | 709/225 |
| 6,170,012 B1 * | 1/2001 | Coss | H04L 63/0281 | 709/225 |
| 6,182,226 B1 * | 1/2001 | Reid | H04L 63/0272 | 709/225 |
| 6,453,419 B1 * | 9/2002 | Flint | H04L 9/40 | 726/1 |
| 6,571,099 B1 * | 5/2003 | Kim | H04B 1/7083 | 455/442 |
| 6,757,659 B1 * | 6/2004 | Tanaka | G11B 27/3027 | 381/104 |
| 6,760,845 B1 * | 7/2004 | Cafarelli | H04L 41/24 | 726/25 |
| 6,826,698 B1 * | 11/2004 | Minkin | H04L 63/0263 | 713/153 |
| 7,047,561 B1 * | 5/2006 | Lee | H04L 63/0263 | 726/13 |
| 7,073,196 B1 * | 7/2006 | Dowd | H04L 63/0263 | 726/4 |
| 7,133,400 B1 * | 11/2006 | Henderson | H04L 49/901 | 709/224 |
| 7,143,438 B1 * | 11/2006 | Coss | H04L 9/40 | 709/224 |
| 7,155,321 B2 * | 12/2006 | Bromley | G07C 5/008 | 701/32.7 |
| 7,190,681 B1 * | 3/2007 | Wu | H04L 12/5601 | 370/316 |
| 7,313,256 B2 * | 12/2007 | Lo | G06V 40/1365 | 382/125 |
| 7,536,476 B1 * | 5/2009 | Alleyne | H04L 45/742 | 726/13 |
| 7,551,078 B2 * | 6/2009 | Carlson | G08B 5/222 | 128/903 |
| 7,551,644 B1 * | 6/2009 | Mohaban | H04L 65/1083 | 370/473 |
| 7,594,259 B1 * | 9/2009 | Audet | H04L 63/029 | 713/153 |
| 7,697,559 B2 * | 4/2010 | Yonemoto | H04L 9/40 | 370/474 |
| 7,746,862 B1 * | 6/2010 | Zuk | H04L 63/0227 | 370/392 |
| 8,050,299 B2 * | 11/2011 | Koga | H04H 20/40 | 455/414.1 |
| 8,200,818 B2 * | 6/2012 | Freund | H04L 63/145 | 709/224 |
| 8,265,255 B1 * | 9/2012 | Abrishami | H04M 7/1205 | 379/220.01 |
| 8,873,545 B2 * | 10/2014 | Ozawa | H04W 88/16 | 370/352 |
| 8,929,401 B2 * | 1/2015 | Herrmann | H04N 21/4345 | 370/476 |
| 9,272,027 B1 * | 3/2016 | Lamkin | A61K 39/0208 | |
| 9,537,891 B1 * | 1/2017 | Walter | H04L 63/102 | |
| 9,609,025 B1 * | 3/2017 | Betzler | H04L 63/0245 | |
| 9,719,347 B2 * | 8/2017 | Murphree | E21B 43/38 | |
| 9,762,619 B1 * | 9/2017 | Vaidya | G06F 9/455 | |
| 9,852,219 B2 * | 12/2017 | Hannuksela | G06F 16/908 | |
| 9,853,754 B1 * | 12/2017 | Muakkit | H04B 7/18519 | |
| 10,009,383 B2 * | 6/2018 | Woolward | H04L 63/0263 | |
| 10,102,487 B2 * | 10/2018 | Jacobs | G06Q 10/063116 | |
| 10,142,290 B1 * | 11/2018 | Brandwine | H04L 63/0263 | |
| 10,356,128 B1 * | 7/2019 | Lango | H04L 63/0263 | |
| 10,484,334 B1 * | 11/2019 | Lee | H04L 67/30 | |
| 10,567,344 B2 * | 2/2020 | Shanks | H04L 63/0263 | |
| 10,594,658 B1 * | 3/2020 | Vixie | H04L 63/20 | |
| 10,652,281 B1 * | 5/2020 | Moolenaar | H04L 63/0236 | |
| 10,730,901 B2 * | 8/2020 | Santos | A61K 47/32 | |
| 10,742,557 B1 * | 8/2020 | Miriyala | H04L 49/70 | |
| 10,778,724 B1 * | 9/2020 | Miriyala | H04L 63/0245 | |
| 10,992,678 B1 * | 4/2021 | Gilman | H04L 63/10 | |
| 11,025,590 B1 * | 6/2021 | Kovenat | H04L 41/0894 | |
| 11,238,528 B2 * | 2/2022 | Vinay | G06Q 40/03 | |
| 11,240,203 B1 * | 2/2022 | Eyada | H04L 63/20 | |
| 11,276,115 B1 * | 3/2022 | Haggerty | G06Q 40/03 | |
| 11,303,738 B2 * | 4/2022 | Minaburo | H04L 63/062 | |
| 11,356,827 B2 * | 6/2022 | Aljohani | H03M 13/6306 | |
| 11,477,692 B2 * | 10/2022 | Teboulle | H04L 1/1621 | |
| 11,483,288 B1 * | 10/2022 | Dunn | H04L 63/0218 | |
| 11,671,870 B2 * | 6/2023 | Tang | H04L 69/04 | 370/229 |
| 11,716,311 B2 * | 8/2023 | Gupta | H04L 41/16 | 726/11 |
| 11,762,371 B1 * | 9/2023 | Sayyar | G05B 23/0275 | 700/28 |
| 11,856,406 B2 * | 12/2023 | Dees | H04W 4/80 | |
| 11,861,605 B2 * | 1/2024 | Deliwala | G06Q 20/322 | |
| 11,882,200 B2 * | 1/2024 | Pelov | H04W 84/18 | |
| 11,914,869 B2 * | 2/2024 | Dain | G06F 21/568 | |
| 12,069,118 B2 * | 8/2024 | Wan | H04L 65/70 | |
| 2002/0007440 A1 * | 1/2002 | Hosoya | G06F 12/0811 | 711/143 |
| 2002/0016826 A1 * | 2/2002 | Johansson | H04L 63/0263 | 709/245 |
| 2002/0037299 A1 * | 3/2002 | Turowski-Wanke | A61K 8/4926 | 424/401 |
| 2002/0046091 A1 * | 4/2002 | Mooers | G06Q 30/02 | 705/14.31 |
| 2002/0118671 A1 * | 8/2002 | Staples | H04L 69/161 | 370/352 |
| 2002/0145985 A1 * | 10/2002 | Love | H04W 48/16 | 370/328 |
| 2002/0156720 A1 * | 10/2002 | Chow | G06Q 40/00 | 705/37 |
| 2002/0157023 A1 * | 10/2002 | Callahan | H04L 63/0245 | 726/4 |
| 2003/0014644 A1 * | 1/2003 | Burns | H04L 63/0263 | 713/182 |
| 2003/0028466 A1 * | 2/2003 | Jenson | G06Q 40/08 | 705/36 R |
| 2003/0044375 A1 * | 3/2003 | Glauder | A61Q 5/006 | 514/400 |

(56) References Cited

U.S. PATENT DOCUMENTS

| | | | |
|---|---|---|---|
| 2003/0063562 A1* | 4/2003 | Sarkinen | H04L 47/50 370/252 |
| 2003/0069259 A1* | 4/2003 | Borcherding | C07D 473/16 514/228.5 |
| 2003/0108043 A1* | 6/2003 | Liao | H04L 63/0227 370/392 |
| 2003/0188192 A1* | 10/2003 | Tang | H04L 63/0263 726/13 |
| 2004/0003290 A1* | 1/2004 | Malcolm | H04L 63/0263 726/28 |
| 2004/0049701 A1* | 3/2004 | Le Pennec | H04L 63/0272 726/11 |
| 2004/0221163 A1* | 11/2004 | Jorgensen | H04L 9/3066 713/182 |
| 2004/0237110 A1* | 11/2004 | Jones, Jr. | H04N 19/00 725/74 |
| 2005/0094562 A1* | 5/2005 | Roy | H04N 21/658 348/E5.022 |
| 2005/0135433 A1* | 6/2005 | Chang | H04N 19/60 375/240 |
| 2005/0177499 A1* | 8/2005 | Thomas | G06Q 20/102 705/40 |
| 2005/0215544 A1* | 9/2005 | Lin | A61K 45/06 514/220 |
| 2005/0215545 A1* | 9/2005 | Lin | A61P 31/18 514/220 |
| 2005/0268335 A1* | 12/2005 | Le | H04L 63/0263 726/13 |
| 2006/0168213 A1* | 7/2006 | Richardson | G06F 21/606 709/225 |
| 2006/0174337 A1* | 8/2006 | Bernoth | H04L 63/0263 726/11 |
| 2006/0195896 A1* | 8/2006 | Fulp | H04L 63/0218 726/13 |
| 2006/0218280 A1* | 9/2006 | Gouda | H04L 63/0263 709/226 |
| 2006/0277601 A1* | 12/2006 | Gouda | H04L 63/0263 726/11 |
| 2006/0294577 A1* | 12/2006 | Gouda | H04L 63/0263 726/1 |
| 2007/0016946 A1* | 1/2007 | Gouda | H04L 63/0263 726/11 |
| 2007/0044132 A1* | 2/2007 | Kubo | H04N 21/4367 725/144 |
| 2007/0091902 A1* | 4/2007 | Stewart | H04L 61/255 370/389 |
| 2007/0110053 A1* | 5/2007 | Soni | H04L 69/22 370/389 |
| 2007/0124204 A1* | 5/2007 | de Boer | G06Q 30/0209 705/14.27 |
| 2007/0192862 A1* | 8/2007 | Vermeulen | H04L 63/1441 726/23 |
| 2007/0211724 A1* | 9/2007 | Johansson | H04L 49/00 370/392 |
| 2007/0256133 A1* | 11/2007 | Garbow | H04L 63/145 726/4 |
| 2008/0022385 A1* | 1/2008 | Crowell | H04L 63/0263 726/11 |
| 2008/0071789 A1* | 3/2008 | Kwasiborski | G06F 16/00 |
| 2008/0126313 A1* | 5/2008 | Jain | G06Q 30/02 |
| 2008/0151900 A1* | 6/2008 | Bi | H04W 28/06 370/389 |
| 2008/0163207 A1* | 7/2008 | Reumann | H04L 63/0263 718/1 |
| 2008/0172347 A1* | 7/2008 | Bernoth | H04L 63/0263 726/13 |
| 2008/0198844 A1* | 8/2008 | Cohen | H04L 12/5692 370/466 |
| 2008/0320584 A1* | 12/2008 | Hamilton, II | H04L 63/0263 726/13 |
| 2009/0064309 A1* | 3/2009 | Boodaei | G06F 21/52 726/12 |
| 2009/0116445 A1* | 5/2009 | Samar | H04W 36/02 455/436 |
| 2009/0154498 A1* | 6/2009 | Hong | H04L 49/9094 370/474 |
| 2009/0197234 A1* | 8/2009 | Creamer | G09B 7/00 434/350 |
| 2009/0222373 A1* | 9/2009 | Choudhuri | G06Q 40/03 705/38 |
| 2009/0222374 A1* | 9/2009 | Choudhuri | G06Q 40/08 705/38 |
| 2009/0222375 A1* | 9/2009 | Choudhuri | G06Q 40/03 705/38 |
| 2009/0222376 A1* | 9/2009 | Choudhuri | G06Q 40/03 705/38 |
| 2009/0222377 A1* | 9/2009 | Choudhuri | G06Q 40/02 705/38 |
| 2009/0222378 A1* | 9/2009 | Choudhuri | G06Q 40/02 705/38 |
| 2009/0222380 A1* | 9/2009 | Choudhuri | G06Q 40/03 705/38 |
| 2009/0248567 A1* | 10/2009 | Haggerty | G06Q 20/10 705/1.1 |
| 2009/0248568 A1* | 10/2009 | Haggerty | G06Q 40/02 705/38 |
| 2009/0248569 A1* | 10/2009 | Haggerty | G06Q 40/03 705/38 |
| 2009/0248570 A1* | 10/2009 | Haggerty | G06Q 20/102 705/38 |
| 2009/0248571 A1* | 10/2009 | Haggerty | G06Q 30/0251 705/1.1 |
| 2009/0248572 A1* | 10/2009 | Haggerty | G06Q 40/00 705/38 |
| 2009/0248573 A1* | 10/2009 | Haggerty | G06Q 40/03 705/38 |
| 2009/0249472 A1* | 10/2009 | Litvin | H04L 63/0263 726/14 |
| 2009/0276842 A1* | 11/2009 | Yevmenkin | H04L 67/1001 726/13 |
| 2009/0293102 A1* | 11/2009 | Klein | H04L 63/0281 726/2 |
| 2010/0010930 A1* | 1/2010 | Allen | G06Q 40/00 705/38 |
| 2010/0048923 A1* | 2/2010 | Nishida | A61P 43/00 568/633 |
| 2010/0067525 A1* | 3/2010 | Matsui | H04N 21/6338 709/227 |
| 2010/0088258 A1* | 4/2010 | Oaten | G06N 5/02 706/50 |
| 2010/0103837 A1* | 4/2010 | Jungck | H04L 63/1458 370/252 |
| 2010/0211610 A1* | 8/2010 | Ahuja | G06Q 10/10 707/803 |
| 2010/0211658 A1* | 8/2010 | Hoogerwerf | H04L 63/20 709/221 |
| 2010/0265932 A1* | 10/2010 | Inoue | H04W 28/06 375/240.01 |
| 2010/0332664 A1* | 12/2010 | Yevmenkin | H04L 67/141 709/227 |
| 2011/0038375 A1* | 2/2011 | Liu | H04L 47/2441 370/392 |
| 2011/0040588 A1* | 2/2011 | Durocher | G06Q 10/06375 705/7.35 |
| 2011/0040591 A1* | 2/2011 | Durocher | G06Q 10/06375 705/7.35 |
| 2011/0225647 A1* | 9/2011 | Dilley | H04L 63/16 726/14 |
| 2012/0010994 A1* | 1/2012 | Allen | G06Q 30/0251 705/14.49 |
| 2012/0054101 A1* | 3/2012 | Duggal | G06Q 30/018 705/44 |
| 2012/0059934 A1* | 3/2012 | Rafiq | H04L 67/1008 709/225 |
| 2012/0123941 A1* | 5/2012 | Kimes | G06Q 20/4016 726/26 |
| 2012/0163180 A1* | 6/2012 | Goel | H04L 45/306 370/238 |

(56) References Cited

U.S. PATENT DOCUMENTS

| | | | |
|---|---|---|---|
| 2012/0204220 A1* | 8/2012 | Lavi | G06F 21/604 726/1 |
| 2012/0325755 A1* | 12/2012 | Turover | A01K 63/10 119/264 |
| 2013/0019277 A1* | 1/2013 | Chang | H04L 63/0227 726/1 |
| 2013/0132511 A1* | 5/2013 | Lee | H04W 4/60 709/217 |
| 2013/0174177 A1* | 7/2013 | Newton | H04L 67/148 718/105 |
| 2013/0176401 A1* | 7/2013 | Monari | H04N 13/20 348/157 |
| 2013/0226779 A1* | 8/2013 | Haggerty | G06Q 40/02 705/38 |
| 2013/0226782 A1* | 8/2013 | Haggerty | G06Q 40/02 705/38 |
| 2013/0230460 A1* | 9/2013 | Jones | A61K 51/0465 435/7.1 |
| 2013/0242983 A1* | 9/2013 | Tripathi | H04L 49/65 370/355 |
| 2013/0305341 A1* | 11/2013 | Baker | H04L 41/0896 726/11 |
| 2013/0339545 A1* | 12/2013 | Shenoi | H04L 63/1408 709/240 |
| 2014/0003434 A1* | 1/2014 | Assarpour | H04L 69/22 370/392 |
| 2014/0019435 A1* | 1/2014 | Ceri | G06Q 10/10 707/706 |
| 2014/0020042 A1* | 1/2014 | Eyer | H04N 21/4823 725/131 |
| 2014/0112395 A1* | 4/2014 | Lee | H04N 21/23406 375/240.26 |
| 2014/0143849 A1* | 5/2014 | Anderson | G06F 13/287 726/11 |
| 2014/0164609 A1* | 6/2014 | Kay | H04L 41/147 709/224 |
| 2014/0169354 A1* | 6/2014 | Xiang | H04W 12/08 370/338 |
| 2014/0230008 A1* | 8/2014 | Feroz | H04L 63/0263 726/1 |
| 2014/0245423 A1* | 8/2014 | Lee | H04L 63/20 726/12 |
| 2014/0279373 A1* | 9/2014 | Saraf | G06Q 40/06 705/37 |
| 2014/0279513 A1* | 9/2014 | Dodds-Brown | G06Q 20/4016 705/44 |
| 2014/0325590 A1* | 10/2014 | Lavi | H04L 63/0263 726/1 |
| 2014/0334381 A1* | 11/2014 | Subramaniam | H04W 4/00 370/328 |
| 2014/0359728 A1* | 12/2014 | Harris | H04L 63/0884 726/5 |
| 2014/0377259 A1* | 12/2014 | Olson | A61P 31/18 424/133.1 |
| 2015/0052575 A1* | 2/2015 | Myla | H04L 63/20 726/1 |
| 2015/0067815 A1* | 3/2015 | Overcash | G06F 1/3278 726/11 |
| 2015/0085749 A1* | 3/2015 | Eravelli | H04L 41/0806 370/328 |
| 2015/0097696 A1* | 4/2015 | Laval | H04L 69/03 340/870.02 |
| 2015/0150079 A1* | 5/2015 | Hyatt | H04L 43/045 726/1 |
| 2015/0163513 A1* | 6/2015 | Yun | H04N 21/816 375/240.16 |
| 2015/0326610 A1* | 11/2015 | Bartoszewski | H04L 41/0813 726/1 |
| 2015/0358288 A1* | 12/2015 | Jain | H04L 43/028 709/224 |
| 2015/0358290 A1* | 12/2015 | Jain | G06F 9/45533 726/13 |
| 2016/0046598 A1* | 2/2016 | Nebolsin | A61P 31/12 514/318 |
| 2016/0080944 A1* | 3/2016 | Colegate | H04L 63/06 455/410 |
| 2016/0127564 A1* | 5/2016 | Sharma | H04L 41/5058 455/406 |
| 2016/0149863 A1* | 5/2016 | Walker | H04L 69/00 726/1 |
| 2016/0182565 A1* | 6/2016 | Salvador | H04L 63/08 726/1 |
| 2016/0191351 A1* | 6/2016 | Smith | H04L 43/045 709/219 |
| 2016/0309364 A1* | 10/2016 | Maheshwari | H03M 7/30 |
| 2016/0352904 A1* | 12/2016 | Conley | G06Q 30/016 |
| 2016/0359697 A1* | 12/2016 | Scheib | H04L 67/01 |
| 2016/0359890 A1* | 12/2016 | Deen | G06F 16/137 |
| 2017/0005985 A1* | 1/2017 | Laue | H04L 63/0236 |
| 2017/0005986 A1* | 1/2017 | Bansal | G06F 9/455 |
| 2017/0005988 A1* | 1/2017 | Bansal | G06F 9/45558 |
| 2017/0064749 A1* | 3/2017 | Jain | G06F 16/9024 |
| 2017/0078168 A1* | 3/2017 | Harris, Jr. | H04L 41/40 |
| 2017/0078249 A1* | 3/2017 | Li | H04L 63/0263 |
| 2017/0171611 A1* | 6/2017 | Nair | H04N 21/4408 |
| 2017/0180319 A1* | 6/2017 | Nimmagadda | H04L 41/0895 |
| 2017/0180320 A1* | 6/2017 | Nimmagadda | G06F 21/604 |
| 2017/0180321 A1* | 6/2017 | Nimmagadda | H04L 63/0263 |
| 2017/0180423 A1* | 6/2017 | Nimmagadda | H04L 63/0263 |
| 2017/0183318 A1* | 6/2017 | Nebolsin | C07D 211/26 |
| 2017/0270509 A1* | 9/2017 | Colegate | H04L 63/061 |
| 2017/0303544 A1* | 10/2017 | Santiago Olmedo | C12N 1/205 |
| 2017/0310738 A1* | 10/2017 | Bansal | H04L 63/1425 |
| 2017/0353433 A1* | 12/2017 | Antony | H04L 47/125 |
| 2018/0041470 A1* | 2/2018 | Schultz | H04L 63/0263 |
| 2018/0054418 A1* | 2/2018 | El Defrawy | H04L 63/10 |
| 2018/0063193 A1* | 3/2018 | Chandrashekhar | G06F 11/2035 |
| 2018/0063195 A1* | 3/2018 | Nimmagadda | H04L 63/0263 |
| 2018/0131719 A1* | 5/2018 | Amit | H04L 63/1441 |
| 2018/0155400 A1* | 6/2018 | Lu | C12N 9/52 |
| 2018/0159943 A1* | 6/2018 | Poon | H04L 67/63 |
| 2018/0176102 A1* | 6/2018 | Bansal | H04L 67/51 |
| 2018/0176185 A1* | 6/2018 | Kumar | H04L 63/0236 |
| 2018/0176252 A1* | 6/2018 | Nimmagadda | H04L 63/20 |
| 2018/0176261 A1* | 6/2018 | Bansal | H04L 67/131 |
| 2018/0183759 A1* | 6/2018 | Gunda | H04L 63/0254 |
| 2018/0183761 A1* | 6/2018 | Gunda | H04L 63/0263 |
| 2018/0183764 A1* | 6/2018 | Gunda | G06F 21/50 |
| 2018/0192427 A1* | 7/2018 | Wang | H04W 28/0268 |
| 2018/0213002 A1* | 7/2018 | Figovsky | G06F 21/53 |
| 2018/0223695 A1* | 8/2018 | Britt | F02C 9/28 |
| 2018/0351818 A1* | 12/2018 | Mohanram | H04L 41/0873 |
| 2018/0367396 A1* | 12/2018 | Kompella | H04L 41/0853 |
| 2019/0044852 A1* | 2/2019 | Nolan | H04L 45/306 |
| 2019/0044873 A1* | 2/2019 | Browne | H04L 47/2441 |
| 2019/0058734 A1* | 2/2019 | Xu | H04L 63/1441 |
| 2019/0089677 A1* | 3/2019 | Ashley | H04L 63/0263 |
| 2019/0089678 A1* | 3/2019 | Lam | H04L 63/0263 |
| 2019/0132002 A1* | 5/2019 | Pennala | H03M 7/6011 |
| 2019/0149512 A1* | 5/2019 | Sevinc | H04L 63/0236 726/11 |
| 2019/0158541 A1* | 5/2019 | Miriyala | H04L 63/205 |
| 2019/0163616 A1* | 5/2019 | Govindaraju | G06F 11/3688 |
| 2019/0182213 A1* | 6/2019 | Saavedra | H04L 63/0218 |
| 2019/0182294 A1* | 6/2019 | Rieke | H04L 63/1433 |
| 2019/0197544 A1* | 6/2019 | Frost | G07F 9/023 |
| 2019/0222558 A1* | 7/2019 | Kahn | H04L 63/0236 |
| 2019/0260712 A1* | 8/2019 | Waterman | H04L 63/164 |
| 2019/0261138 A1* | 8/2019 | Thubert | H04L 1/1685 |
| 2019/0319923 A1* | 10/2019 | Tu | H04L 63/0218 |
| 2019/0325468 A1* | 10/2019 | Nagarajan | G06Q 30/0207 |
| 2019/0364072 A1* | 11/2019 | Purusothaman | H04L 63/0263 |
| 2019/0386960 A1* | 12/2019 | Huang | H04L 63/0263 |
| 2020/0007395 A1* | 1/2020 | Fainberg | H04L 63/0263 |
| 2020/0007396 A1* | 1/2020 | Fainberg | H04L 43/045 |
| 2020/0007397 A1* | 1/2020 | Fainberg | H04L 41/0226 |
| 2020/0007583 A1* | 1/2020 | Dixit | H04L 63/102 |
| 2020/0022022 A1* | 1/2020 | Ly | H04L 69/04 |
| 2020/0045018 A1* | 2/2020 | Bargury | H04L 41/0813 |

(56) References Cited

U.S. PATENT DOCUMENTS

| | | | |
|---|---|---|---|
| 2020/0045081 A1* | 2/2020 | Ritchey | H04L 63/20 |
| 2020/0065080 A1* | 2/2020 | Myneni | H04L 63/1408 |
| 2020/0065166 A1* | 2/2020 | Myneni | G06F 9/5061 |
| 2020/0099659 A1* | 3/2020 | Cometto | H04L 63/0263 |
| 2020/0106744 A1* | 4/2020 | Miriyala | H04L 41/0893 |
| 2020/0106808 A1* | 4/2020 | Schütz | H04L 63/0263 |
| 2020/0112540 A1* | 4/2020 | Venkataraman | H04L 63/0263 |
| 2020/0128065 A1* | 4/2020 | Ganapathi | H04L 43/08 |
| 2020/0137628 A1* | 4/2020 | Kandasamy | H04L 67/5651 |
| 2020/0177550 A1* | 6/2020 | Valluri | H04L 41/0806 |
| 2020/0184017 A1* | 6/2020 | Batra | G06F 16/953 |
| 2020/0195982 A1* | 6/2020 | Streater | H04N 21/2187 |
| 2020/0213325 A1* | 7/2020 | Scherman | H04L 63/1425 |
| 2020/0213423 A1 | 7/2020 | Jain et al. | |
| 2020/0228538 A1* | 7/2020 | Soule | H04L 63/105 |
| 2020/0228571 A1* | 7/2020 | Aharchaou | H04L 63/08 |
| 2020/0236086 A1* | 7/2020 | Patil | G06F 9/45558 |
| 2020/0250591 A1* | 8/2020 | Tracy | G06Q 10/02 |
| 2020/0259793 A1* | 8/2020 | Pangeni | H04L 41/5006 |
| 2020/0259797 A1* | 8/2020 | Fan | G06F 21/6263 |
| 2020/0259896 A1* | 8/2020 | Sachs | H04W 56/0065 |
| 2020/0274852 A1* | 8/2020 | Ahmed | H04L 41/0816 |
| 2020/0296139 A1* | 9/2020 | Fainberg | H04L 63/205 |
| 2020/0322309 A1* | 10/2020 | Fischbach | H04L 61/2514 |
| 2020/0329011 A1* | 10/2020 | Cai | H04L 41/145 |
| 2020/0358814 A1* | 11/2020 | Willey | H04L 63/0263 |
| 2020/0366730 A1* | 11/2020 | Yevmenkin | H04L 67/1001 |
| 2020/0388390 A1* | 12/2020 | Singh | H04L 63/20 |
| 2020/0389440 A1* | 12/2020 | Zhao | H04W 28/0284 |
| 2020/0396207 A1* | 12/2020 | Motwani | G06F 11/3476 |
| 2020/0412841 A1* | 12/2020 | Pelov | H04L 69/22 |
| 2021/0014272 A1* | 1/2021 | Masciarelli | H04L 63/1408 |
| 2021/0021510 A1* | 1/2021 | Wetterwald | H04L 47/125 |
| 2021/0044563 A1* | 2/2021 | Reyes | G06F 21/564 |
| 2021/0044565 A1* | 2/2021 | Moreno | H04L 45/745 |
| 2021/0051134 A1* | 2/2021 | Minaburo | H04W 84/18 |
| 2021/0051178 A1* | 2/2021 | Kuppannan | H04L 63/20 |
| 2021/0051218 A1* | 2/2021 | Minaburo | H04L 61/4511 |
| 2021/0058477 A1* | 2/2021 | Keranen | H03M 7/30 |
| 2021/0058478 A1* | 2/2021 | Thubert | H04L 61/5014 |
| 2021/0075767 A1* | 3/2021 | Jain | H04W 36/0044 |
| 2021/0110292 A1* | 4/2021 | Minaburo | H04L 69/04 |
| 2021/0119859 A1* | 4/2021 | Radhakrishnan | H04L 63/0263 |
| 2021/0119971 A1* | 4/2021 | Radhakrishnan | H04W 4/70 |
| 2021/0127291 A1* | 4/2021 | Chen | H04W 28/0234 |
| 2021/0143160 A1* | 5/2021 | Ryu | H10B 43/27 |
| 2021/0144123 A1* | 5/2021 | Dunn | G06F 16/2228 |
| 2021/0194760 A1* | 6/2021 | Barton | H04L 47/2441 |
| 2021/0218652 A1* | 7/2021 | Raut | H04L 63/20 |
| 2021/0218771 A1* | 7/2021 | Khouderchah | H04L 63/0263 |
| 2021/0234901 A1* | 7/2021 | Thomas | G06F 9/5027 |
| 2021/0286345 A1* | 9/2021 | Gray | G05B 19/41835 |
| 2021/0297509 A1* | 9/2021 | Thubert | H04W 72/1221 |
| 2021/0314299 A1* | 10/2021 | Gopal | H04L 63/0263 |
| 2021/0314423 A1* | 10/2021 | Rolando | H04L 67/04 |
| 2021/0314815 A1* | 10/2021 | Gangakhedkar | H04L 69/04 |
| 2021/0320903 A1* | 10/2021 | Kalaycilar | H04L 43/06 |
| 2021/0353220 A1* | 11/2021 | Shi | A61B 5/004 |
| 2021/0360535 A1* | 11/2021 | Eriksson | H04W 52/243 |
| 2021/0409376 A1* | 12/2021 | Nagargoje | H04L 63/1425 |
| 2022/0015162 A1* | 1/2022 | Camarillo Gonzalez | H04W 4/70 |
| 2022/0021653 A1* | 1/2022 | Metz | H04L 63/168 |
| 2022/0051361 A1* | 2/2022 | Cella | G06F 16/2308 |
| 2022/0057967 A1* | 2/2022 | Kim | G06F 3/0604 |
| 2022/0103593 A1* | 3/2022 | Singh | H04L 63/0245 |
| 2022/0103598 A1* | 3/2022 | Vaidya | H04L 63/0218 |
| 2022/0170038 A1* | 6/2022 | Allen | C12N 9/0095 |
| 2022/0187847 A1* | 6/2022 | Cella | G06Q 10/06 |
| 2022/0197247 A1* | 6/2022 | Cella | G06N 5/025 |
| 2022/0200960 A1* | 6/2022 | Laplume | H04L 63/0245 |
| 2022/0210126 A1* | 6/2022 | Keiser | H04L 63/104 |
| 2022/0237565 A1* | 7/2022 | Dzierzanowski | G06Q 30/018 |
| 2022/0245574 A1* | 8/2022 | Cella | G06Q 10/087 |
| 2022/0286379 A1* | 9/2022 | Hofer | H04L 45/08 |
| 2022/0289698 A1* | 9/2022 | Grabner | C07D 277/06 |
| 2022/0303246 A1* | 9/2022 | Miriyala | H04L 41/0806 |
| 2022/0329586 A1* | 10/2022 | Ståhl | H04W 4/50 |
| 2022/0337555 A1* | 10/2022 | Gol | H04L 63/0236 |
| 2022/0366354 A1* | 11/2022 | Maiman | G06Q 10/083 |
| 2022/0374294 A1* | 11/2022 | van der Merwe | G06F 9/4812 |
| 2022/0385635 A1* | 12/2022 | Thimmisetty | H04L 63/1425 |
| 2022/0385745 A1* | 12/2022 | Pelov | H04L 69/22 |
| 2023/0013320 A1* | 1/2023 | Eller | G06Q 40/06 |
| 2023/0013626 A1* | 1/2023 | SayyarRodsari | G05B 13/042 |
| 2023/0083724 A1* | 3/2023 | Cella | G06Q 10/06315 705/28 |
| 2023/0092247 A1* | 3/2023 | Sayyar | G06T 7/0004 700/109 |
| 2023/0104129 A1* | 4/2023 | Miriyala | H04L 63/0263 709/220 |
| 2023/0113092 A1* | 4/2023 | Abraham | G06N 20/00 706/12 |
| 2023/0155978 A1* | 5/2023 | Thubert | H04L 61/4511 709/245 |
| 2023/0155981 A1* | 5/2023 | Hooda | H04L 45/745 726/1 |
| 2023/0198949 A1* | 6/2023 | Zhou | H04L 63/20 726/11 |
| 2023/0230154 A1* | 7/2023 | Hochstatter | G06Q 20/4016 705/38 |
| 2023/0247001 A1* | 8/2023 | Nam | H04L 63/20 726/11 |
| 2023/0247002 A1* | 8/2023 | Nyamwange | H04L 9/0894 726/1 |
| 2023/0252160 A1* | 8/2023 | White | G06F 21/577 726/25 |
| 2023/0252545 A1* | 8/2023 | Cella | G06N 10/60 707/802 |
| 2023/0269228 A1* | 8/2023 | Mestery | H04L 63/0263 726/2 |
| 2023/0379250 A1* | 11/2023 | Thubert | H04L 45/42 |
| 2023/0422023 A1* | 12/2023 | Thubert | H04W 8/26 |
| 2024/0098063 A1* | 3/2024 | Thubert | H04L 63/0263 |
| 2024/0117326 A1* | 4/2024 | Johnston | C12N 9/0095 |
| 2024/0193910 A1* | 6/2024 | Okayama | G06V 10/94 |
| 2024/0314396 A1* | 9/2024 | Streater | H04N 21/435 |
| 2024/0371481 A1* | 11/2024 | Bhatt | G16H 50/20 |
| 2025/0054008 A1* | 2/2025 | Cella | G06N 5/043 |

OTHER PUBLICATIONS

El-Atawy et al "Adaptive Early Packet Filtering for Defending Firewalls Against DOS Attacks," IEEE, pp. 2437-2445 (Year: 2009).*

Ayoub et al SCHC-Based Solution for Roaming in LoRaWAN, pp. 1-13, (Year: 2019).*

Moons et al "Device Discovery and Context Registration in Static Context Header Compression Networks," MDPI, pp. 1-28 (Year: 2021).*

Abdelfadeel et al "LSCHC: Layered Static Context Header Compression for LPWANs," Chants' 17, Oct. 20, 2017, pp. 13-18).*

Sanchez-Gomez et al "Integrating LPWAN Technologies in the 5G Ecosystem: A Survey on Security Challenges and Solutions," IEEE Access, pp. 216437-216460 (Year: 2020).*

Minaburo et al."RFC 8724: SCHC: Generic Framework for Static Context Header Compression and Fragmentation," IETF, pp. 1-71 (Year: 2020).*

Yin et al "A Novel Computer Network Intrusion Detection Algorithm Based on OSVM and Context Validation," IEEE, pp. 591-595 (Year: 2016).*

El-Ataway et al "An Automated Framework for Validating Firewall Policy Enforcement," IEEE Computer Society, pp. 1-10 (Year: 2007).*

Jin-Hua et al "A Flexible Policy-Based Firewall Management Framework," IEEE Computer Society, pp. 192-194 (Year: 2008).*

El-Atawy et al "An Automated Framework for Validating Firewall Policy Enforcement," IEEE Computer Society, pp. 1-10 (Year: 2007).*

(56) References Cited

OTHER PUBLICATIONS

Toutain, Laurent, Ana Carolina Minaburo and Carles Gomez. "LPWAN Static Context Header Compression (SCHC) and fragmentation for IPv6 and UDP." 2018). draft-ietf-lpwan-ipv6-static-context-hc-17—LPWAN Static Context Header Compression (SCHC) and fragmentation for IPv6 and UDP.

* cited by examiner

SYSTEM AND METHOD FOR PROVIDING SCHC-BASED EDGE FIREWALLING

TECHNICAL FIELD

The present disclosure relates generally to wireless networks, and more specifically to providing edge firewalling using a Static Context Header Compression rules engine.

BACKGROUND

Static Context Header Compression (SCHC) is a stateful compression technique that recognizes regular expressions as bit patterns and compresses them. SCHC is designed for the Internet of Things (IoT), and the patterns are typically provided by a device vendor. A regular expression is provided as a matching rule and used to compress packets sent in a network.

BRIEF DESCRIPTION OF THE DRAWINGS

For a more complete understanding of the present disclosure and for further features and advantages thereof, reference is now made to the following description taken in conjunction with the accompanying drawings, in which.

DESCRIPTION OF EXAMPLE EMBODIMENTS

Overview

Figure 1:
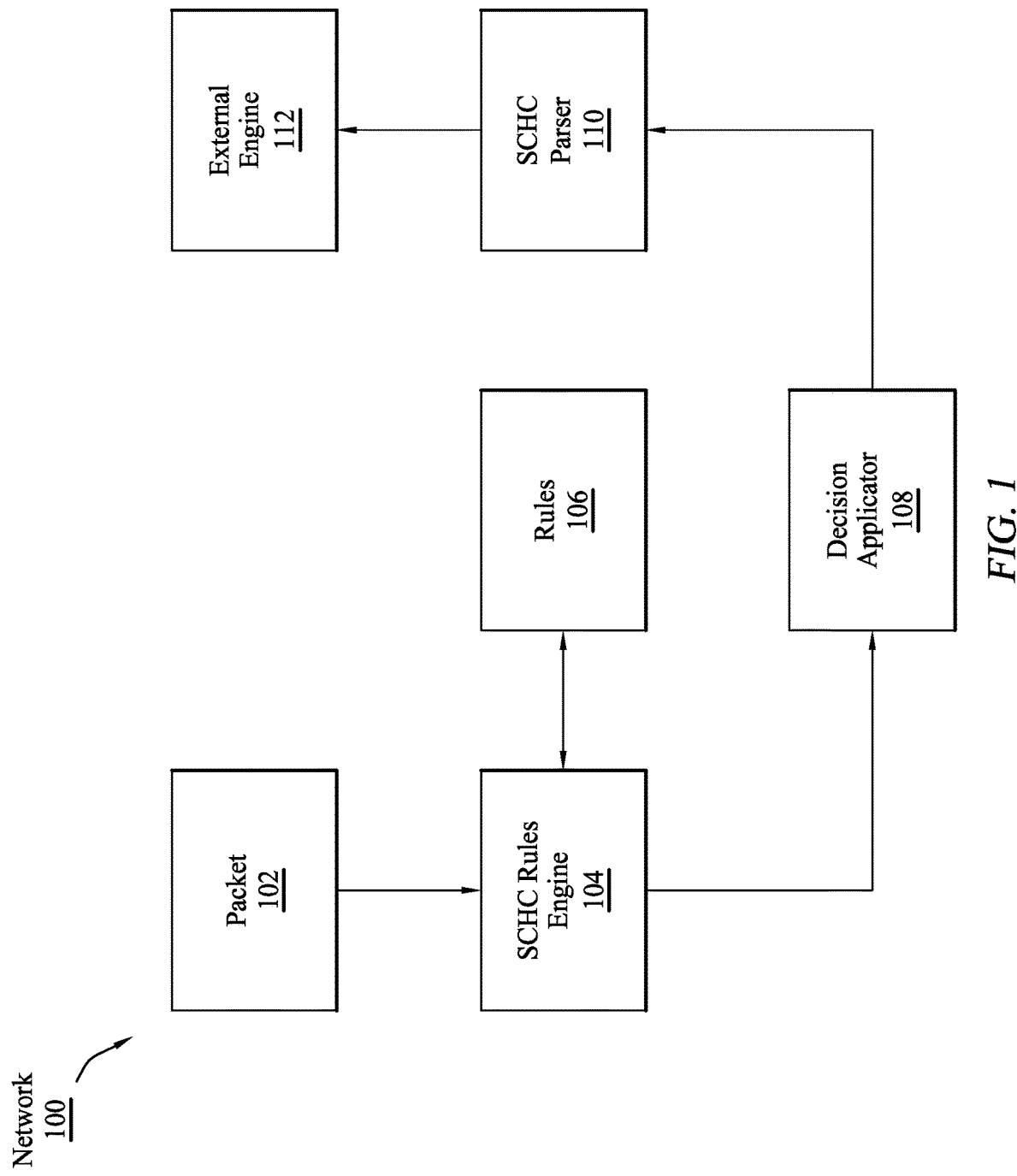
FIG. 1 illustrates a system for providing edge firewalling using an SCHC rules engine, in accordance with certain embodiments.

Static Context Header Compression (SCHC) is a stateful compression technique that recognizes regular expressions as bit patterns and compresses them. SCHC is designed for the Internet of Things (IoT), and the patterns are typically provided by a device vendor. A regular expression is provided as a matching rule and used to compress packets sent in a network. In addition to compression, however, SCHC can be used to move certain firewalling decisions to the edge router.

According to an embodiment, a system includes one or more processors and one or more computer-readable non-transitory storage media coupled to the one or more processors. The one or more computer-readable non-transitory storage media include instructions that, when executed by the one or more processors, cause one or more components of the system to perform operations including identifying, using an SCHC rules engine, one or more packets matching a rule. The operations also include selecting a firewall decision based on the identified one or more packets and the rule. The operations further include applying the firewall decision to the one or more identified packets.

In certain embodiments, the operations may include applying a tag to one or more packets. The operations may also include identifying the tag applied to the one or more packets, and performing an action on the one or more packets based on the identified tag. In some embodiments, the operations may also include transmitting one or more packets to an external engine. The operations may also include compressing the one or more packets using an SCHC rules engine. The operations may also include decompressing the one or more packets.

According to another embodiment, a method includes identifying, using a SCHC rules engine, one or more packets matching a rule. The method also includes selecting a firewall decision based on the identified one or more packets and the rule. The method further includes applying the firewall decision to the one or more identified packets.

According to yet another embodiment, one or more computer-readable non-transitory storage media embody instructions that, when executed by a processor, cause the processor to perform operations including identifying, using a SCHC rules engine, one or more packets matching a rule. The operations also include selecting a firewall decision based on the identified one or more packets and the rule. The operations further include applying the firewall decision to the one or more identified packets.

Technical advantages of certain embodiments of this disclosure may include one or more of the following. Embodiments of this disclosure delegate the first level firewalling parsing to the edge router (or switch, access point, or Internet of Things (IoT) gateway) that faces a monitored device using SCHC. This disclosure leverages the SCHC engine to program highly selective, multi-layered firewalling functions.

Other technical advantages will be readily apparent to one skilled in the art from the following figures, descriptions, and claims. Moreover, while specific advantages have been enumerated above, various embodiments may include all, some, or none of the enumerated advantages.

EXAMPLE EMBODIMENTS

Figure 2:
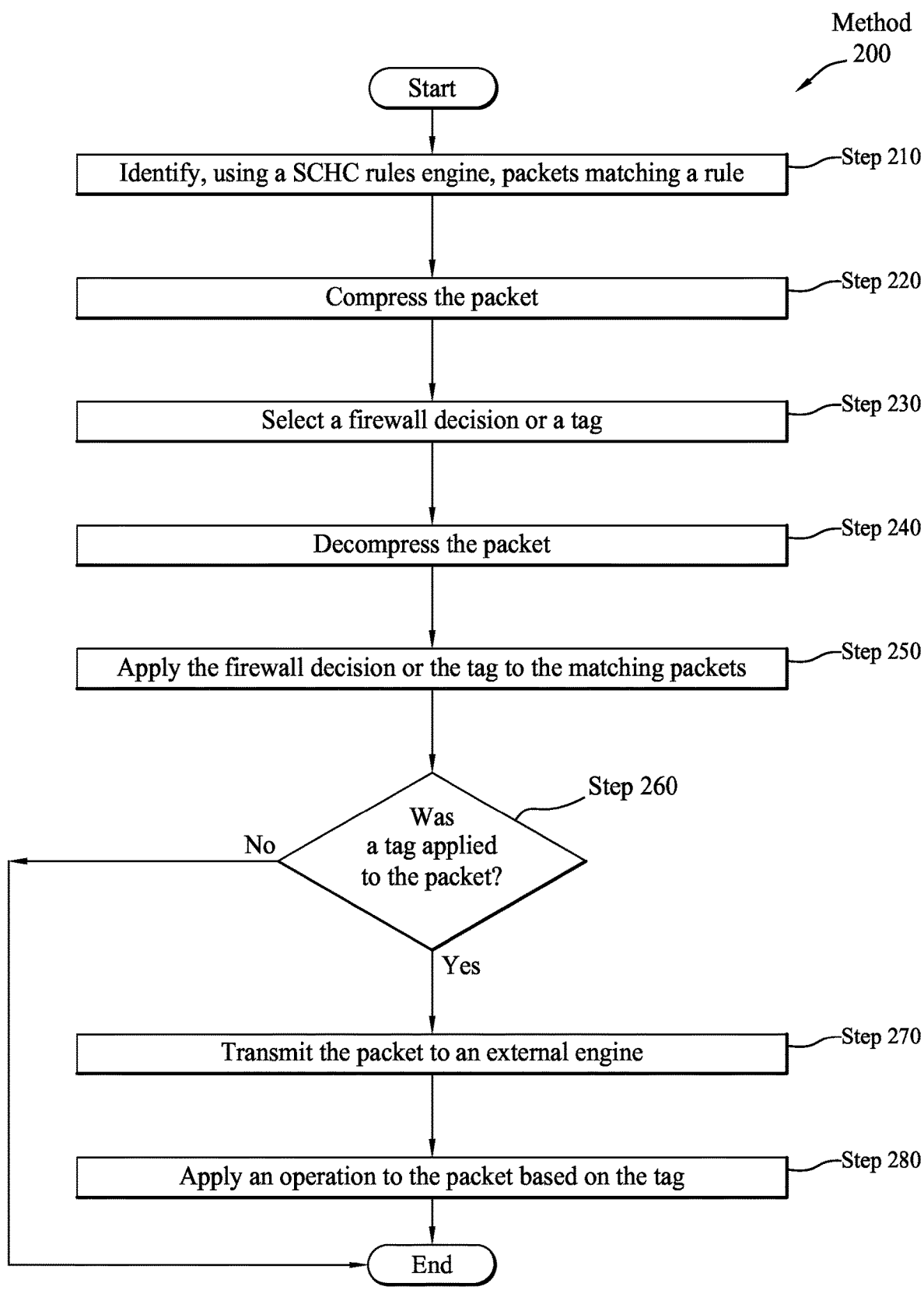
FIG. 2 illustrates a method for edge firewalling using an SCHC rules engine, in accordance with certain embodiments.
Figure 3:
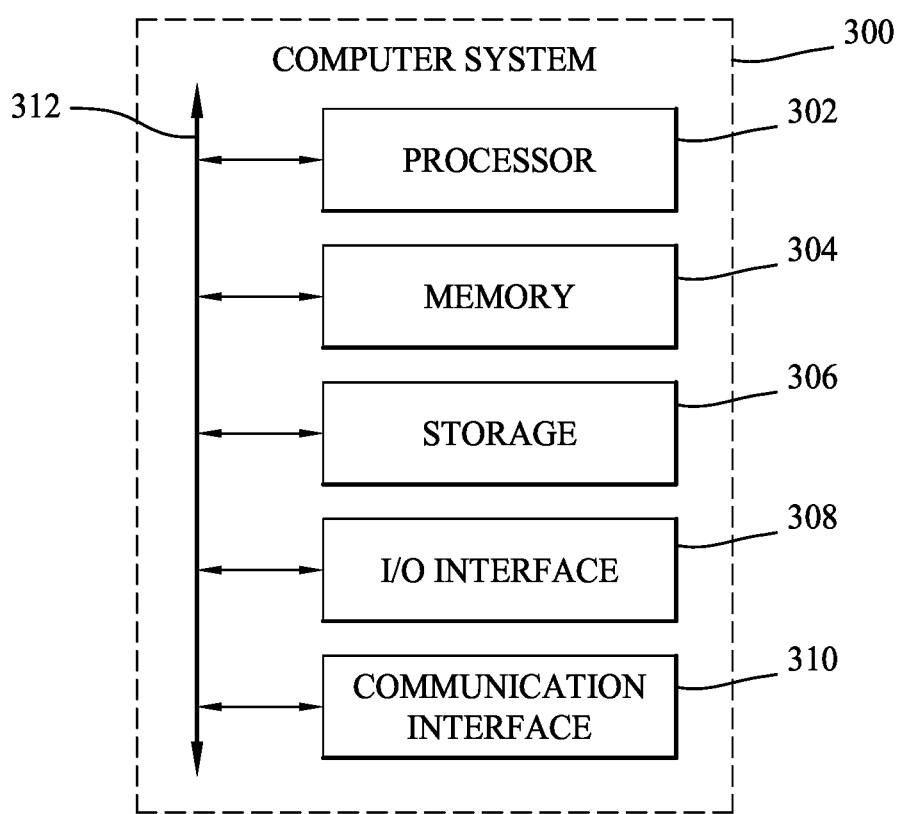
FIG. 3 illustrates an example of a computer system, in accordance with certain embodiments.

This disclosure describes systems and methods for providing edge firewalling using an SCHC rules engine. FIG. 1 illustrates a system for providing edge firewalling using an SCHC rules engine, in accordance with certain embodiments. FIG. 2 illustrates a method for providing edge firewalling using an SCHC rules engine, in accordance with certain embodiments. FIG. 3 illustrates an example of a computer system, in accordance with certain embodiments.

FIG. 1 illustrates a system for providing edge firewalling using an SCHC rules engine, in accordance with certain embodiments. In the illustrated embodiment, network 100 includes packet 102, SCHC rules engine 104, rules 106, decision applicator 108, SCHC parser 110, and external engine 112.

Network 100 is any type of network that facilitates communication between components of network 100. Network 100 may connect one or more components of network 100. One or more portions of network 100 may include an ad-hoc network, an intranet, an extranet, a virtual private network (VPN), an Ethernet VPN (EVPN), a local area network (LAN), a wireless LAN (WLAN), a virtual LAN (VLAN), a wide area network (WAN), a wireless WAN (WWAN), an SD-WAN, a metropolitan area network (MAN), a portion of the Internet, a portion of the Public Switched Telephone Network (PSTN), a cellular telephone network, a Digital Subscriber Line (DSL), an Multiprotocol Label Switching (MPLS) network, a 3G/4G/5G network, a Long Term Evolution (LTE) network, a cloud network, a combination of two or more of these, or other suitable types of networks. Network 100 may include one or more different types of networks. Network 100 may be any communications network, such as a private network, a public network, a connection through the Internet, a mobile network, a WI-FI network, etc. One or more components of network 100 may communicate over network 100. Network 100 may include a core network (e.g., the Internet), an access network of a service provider, an Internet service provider (ISP) network, and the like.

Packet 102 includes control information and user data. In certain embodiments, control information provides data for delivering a payload. For example, the control information may include a source network address, a destination network address, an error detection code, a security parameter (e.g., a security parameter index (SPI)), sequencing information (e.g., a sequence number), integrity check information (e.g., an integrity check value (ICV)), and the like. In certain embodiments, the control information is in the header and/or trailer of packet 102. The control information of packet 102 may be used to uniquely identify a dropped or lost packet 102. In certain embodiments, packet 102 may contain a User Internet Protocol (IP) header, a User Data Protocol (UDP)/Transmission Control Protocol (TCP) header, and a payload. A user IP header represents information used to route packet 102 through network 100. For example, a user IP header may include an IP version number, a source IP address, and a destination IP address. A UDP/TCP header may represent information used to route packet 102 through network 100. For example, a UDP/TCP header may contain a source port number, a destination port number, a sequence number, and an acknowledgement number. A payload may represent the data being transported by packet 102 in network 100.

SCHC rules engine 104 may refer to an engine for analyzing one or more packets 102 and identifying packets 102 that match one or more rules 106. Rules 106 may refer to a set of one or more rules for expressing firewall decisions that are used by the SCHC rules engine 104 to match bit patterns in packet 102. In certain embodiments, rules 106 may represent firewall decisions. For example, rules 106 may require a route map to be applied to packet 102 such that packet 102 is routed using a particular path in network 100. As another example, rules 106 may require an access control list (ACL) to be enforced on packet 102 as a way to block certain packets 102. As another example, rules 106 may require packet 102 to be dropped or punted. As another example, rules 106 may require packet 102 to be tagged with some action to be taken upon packet 102 in the future. For example, packet 102 may be tagged with an action later performed upon packet 102 by external engine 112. In certain embodiments, rules 106 may represent permissible destination addresses for packet 102. In certain embodiments, rules 106 may express upper layer protocols. For examples, rules 106 may require that packet 102 is encrypted (e.g., by matching a Transport Layer Security (TLS) protocol header of packet 102). In certain embodiments, rules 106 may further include compression and fragmentation rules. For example, rules 106 may represent compression formats that may match bit patterns of the one or more packets 102.

Decision applicator 108 may refer to one or more components for applying firewall decisions to one or more packets 102 based on one or more rules 106 determined by SCHC rules engine 104 to match the one or more packets 102. In certain embodiments, decision applicator 108 may be an edge router that has one or more components to analyze data being sent across a network, determine routes for the data to travel the network based on the analysis, and/or communicate the data in accordance with the determined routes. The edge router may apply firewall decisions to one or more packets 102 based on the one or more rules 106 determined by rules engine 104 to match the one or more packets 102. In certain embodiments, decision applicator 108 may be a virtual router or a physical router.

SCHC parser 110 may refer to one or more components for applying tags representing future actions to be taken on one or more packets 102. SCHC parser 110 may be implemented on suitable hardware and/or software for applying tags to the one or more packets 102. In certain embodiments, SCHC parser 110 applies one or more tags to one or more packets 102 based on one or more rules 106 determined by SCHC rules engine 104 to match the one or more packets 102. In certain embodiments, SCHC parser 110 communicates with a Cisco® Identity Services Engine (ISE) server so that SCHC parser 110 may apply ISE tags to the one or more packets 102. In certain embodiments, the ISE tags applied by SCHC parser 110 may differ from the matching rules 106.

External engine 112 may comprise a system for taking an action upon packet 102 if packet 102 was tagged with an action by SCHC rules engine 104. In certain embodiments, external engine 112 may be an external server (e.g., an Nginx® server). In certain embodiments, external engine 112 may be a policy server (e.g., Cisco® Identity Services Engine (ISE) server). In certain embodiments external engine 112 may be an external firewall. For example, external engine 112 may comprise policies associated with a tag applied to packet 102. In certain embodiments, external engine 112 may be a router comprising a virtual routing and forwarding (VRF) protocol enabling a multiple routing topology. For example, external engine 112 may block packet 102 from leaving network 100 where packet 102 is tagged by SCHC rule engine 104 with a tag indicating packet 102 cannot leave network 100.

In an exemplary embodiment of operation, SCHC rules engine 104 receives one or more packets 102. SCHC rules engine 104 identifies one or more of the received packets 102 that match one or more rules 106. For example, SCHC rules engine 104 may match bit patterns of one or more headers of packet 102 to bit patterns of one or more rules 106. In certain embodiments, for each identified matching packet 102, SCHC rules engine 104 selects a firewall decision based on the identified matching packet 102 and the matching rules 106. In the exemplary embodiment, decision applicator 108 performs the selected firewall decision on the identified matching packet 102. For example, decision applicator 108 may block packet 102 from being routed through network 100 based on an access control list. As another example, decision applicator 108 may route packet 102 based on a routing map. As another example, decision applicator 108 may drop packet 102 from network 100. In the exemplary embodiment, SCHC parser 110 may further tag the identified matching packet 102 with a future action to be performed on packet 102 by external engine 112 based on the matching rule. If packet 102 is tagged with a future action to be performed, SCHC parser 110 may send packet 102 to external engine 112. External engine 112 may then perform the tagged action on packet 102. For example, external engine 112 may first identify the tag applied to packet 102 and perform a particular action on packet 102 based on the identified tag. In certain embodiments, SCHC rules engine 104 may additionally match one or more rules 106 for compressing one or more packets 102. In certain further embodiments, decision applicator 108 may first decompress packet 102 before applying the selected firewall decision.

Although FIG. 1 illustrates a particular number of networks 100, packets 102, SCHC rules engines 104, rules 106, decision applicators 108, SCHC parsers 110, and external engines 112, this disclosure contemplates any suitable number of networks 100, packets 102, SCHC rules engines 104, rules 106, decision applicators 108, SCHC parsers 110, and external engines 112. Additionally, this disclosure contemplates any suitable arrangement of network 100, packet 102, SCHC rules engine 104, rules 106, decision applicator 108, SCHC parser 110, and external engine 112. Additionally, this disclosure contemplates any suitable combination of any suitable components, devices, or systems carrying out any suitable actions.

FIG. 2 illustrates a method for edge firewalling using an SCHC rules engine, in accordance with certain embodiments. Method 200 begins at step 210. At step 210, an SCHC rules engine (e.g., SCHC rules engine 104 of FIG. 1) identifies one or more packets (e.g., packet 102 of FIG. 1) matching a rule (e.g., rules 106 of FIG. 1). Method 200 then moves from step 210 to step 220.

At step 220, the one or more packets are compressed. For example, the rule of step 210 may represent compression formats and the rule may match the compression formats to bit patterns of the one or more packets. The one or more packets of step 210 that match a rule representing a compression format may be compressed according to the compression format. Method 200 then moves from step 220 to step 230.

At step 230, the SCHC rules engine selects a firewall decision or a tag. For example, the firewall decision may be a route map to be applied to the packet. As another example, the firewall decision may require an ACL to be enforced on the packet. As another example, the firewall decision may require the packet to be dropped or punted. Method 200 then moves from step 230 to step 240.

At step 240, the one or more packets are decompressed. For example, the one or more packets compressed in step 220 may be decompressed based on the compression format which matched bit patterns of the one or more packets. Method 200 then moves from step 240 to step 250.

At step 250, the firewall decision or the tag is applied to the one or more packets. For example, a decision applicator (e.g., decision applicator 108 of FIG. 1) applies the firewall decision to the one or more packets. As another example, an SCHC parser (e.g., SCHC parser 110 of FIG. 1) applies the tag to the one or more packets. Method 200 then moves from step 250 to step 260.

At step 260, the SCHC parser determines if a tag was applied to the one or more packets. If a tag was applied to the one or more packets, method 200 moves from step 260 to step 270. If no tag was applied to the one or more packets, method 200 ends at step 260.

At step 270, the SCHC parser transmits the one or more packets to an external engine (e.g., external engine 112 of FIG. 1). For example, the external engine may be an external server (e.g., an Nginx® server). As another example, the external engine may be a policy server (e.g., Cisco® ISE). As another example, the external engine may be an external firewall. As another example, the external engine may be a router in a multiple routing topology. Method 200 then moves from step 270 to step 280.

At step 280, the external engine applies an operation to the one or more packets based on the tag. For example, the operation may be an operation associated with a policy server (e.g., Cisco® ISE). As another example, the operation may be an operation applied by a router in a multiple routing topology that restricts the one or more packets from leaving the network. As another example, the operation may be associated with policies to be applied by an external firewall. The operation may restrict or allow the one or more packets to be transmitted outside of the network. The operation may further include the firewall decisions described in step 230 to be applied by the external engine. Method 200 ends at step 280.

Although this disclosure describes and illustrates an example method 200 for a method for providing edge firewalling using an SCHC rules engine, including the particular steps of the method of FIG. 2, this disclosure contemplates any suitable method 200 for a method for providing edge firewalling using an SCHC rules engine, including any suitable steps, which may include all, some, or none of the steps of the method of FIG. 2, where appropriate. Although this disclosure describes and illustrates particular steps of method 200 of FIG. 2 as occurring in a particular order, this disclosure contemplates any suitable steps of method 200 of FIG. 2 occurring in any suitable order. Although this disclosure describes and illustrates particular components, devices, or systems carrying out particular steps of method 200 of FIG. 2, this disclosure contemplates any suitable combination of any suitable components, devices, or systems carrying out any suitable steps of method 200 of FIG. 2.

FIG. 3 illustrates an example of a computer system, in accordance with certain embodiments. In particular embodiments, one or more computer systems 300 provide functionality described or illustrated herein. As an example, one or more computer systems 300 may be used to provide at least a portion of network 100, SCHC rules engine 104, rules 106, decision applicator 108, SCHC parser 110, and external engine 112 as described with respect to FIG. 1. As another example, one or more computer systems 300 may be used to perform one or more steps as described with respect to FIG. 2. In particular embodiments, software running on one or more computer systems 300 provides functionality described or illustrated herein or performs one or more steps of one or more methods described or illustrated herein. Particular embodiments include one or more portions of one or more computer systems 300. Herein, reference to a computer system may encompass a computing device, and vice versa, where appropriate. Moreover, reference to a computer system may encompass one or more computer systems, where appropriate.

This disclosure contemplates any suitable number of computer systems 300. This disclosure contemplates computer system 300 taking any suitable physical form. As example and not by way of limitation, computer system 300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 300 may include one or more computer systems 300; be unitary or distributed; span multiple locations; span multiple machines; span multiple data centers; or reside in a cloud, which may include one or more cloud components in one or more networks. Where appropriate, one or more computer systems 300 may perform without substantial spatial or temporal limitation one or more steps of one or more methods described or illustrated herein. As an example and not by way of limitation, one or more computer systems 300 may perform in real time or in batch mode one or more steps of one or more methods described or illustrated herein. One or more computer systems 300 may perform at different times or at different locations one or more steps of one or more methods described or illustrated herein, where appropriate.

In particular embodiments, computer system 300 includes a processor 302, memory 304, storage 306, an input/output (I/O) interface 308, a communication interface 310, and a bus 312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 302 includes hardware for executing instructions, such as those making up a computer program. As an example and not by way of limitation, to execute instructions, processor 302 may retrieve (or fetch) the instructions from an internal register, an internal cache, memory 304, or storage 306; decode and execute them; and then write one or more results to an internal register, an internal cache, memory 304, or storage 306. In particular embodiments, processor 302 may include one or more internal caches for data, instructions, or addresses. This disclosure contemplates processor 302 including any suitable number of any suitable internal caches, where appropriate. As an example, and not by way of limitation, processor 302 may include one or more instruction caches, one or more data caches, and one or more translation lookaside buffers (TLBs). Instructions in the instruction caches may be copies of instructions in memory 304 or storage 306, and the instruction caches may speed up retrieval of those instructions by processor 302. Data in the data caches may be copies of data in memory 304 or storage 306 for instructions executing at processor 302 to operate on; the results of previous instructions executed at processor 302 for access by subsequent instructions executing at processor 302 or for writing to memory 304 or storage 306; or other suitable data. The data caches may speed up read or write operations by processor 302. The TLBs may speed up virtual-address translation for processor 302. In particular embodiments, processor 302 may include one or more internal registers for data, instructions, or addresses. This disclosure contemplates processor 302 including any suitable number of any suitable internal registers, where appropriate. Where appropriate, processor 302 may include one or more arithmetic logic units (ALUs); be a multi-core processor; or include one or more processors 302. Although this disclosure describes and illustrates a particular processor, this disclosure contemplates any suitable processor.

In particular embodiments, memory 304 includes main memory for storing instructions for processor 302 to execute or data for processor 302 to operate on. As an example and not by way of limitation, computer system 300 may load instructions from storage 306 or another source (such as, for example, another computer system 300) to memory 304. Processor 302 may then load the instructions from memory 304 to an internal register or internal cache. To execute the instructions, processor 302 may retrieve the instructions from the internal register or internal cache and decode them. During or after execution of the instructions, processor 302 may write one or more results (which may be intermediate or final results) to the internal register or internal cache. Processor 302 may then write one or more of those results to memory 304. In particular embodiments, processor 302 executes only instructions in one or more internal registers or internal caches or in memory 304 (as opposed to storage 306 or elsewhere) and operates only on data in one or more internal registers or internal caches or in memory 304 (as opposed to storage 306 or elsewhere). One or more memory buses (which may each include an address bus and a data bus) may couple processor 302 to memory 304. Bus 312 may include one or more memory buses, as described below. In particular embodiments, one or more memory management units (MMUs) reside between processor 302 and memory 304 and facilitate accesses to memory 304 requested by processor 302. In particular embodiments, memory 304 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 304 may include one or more memories 304, where appropriate. Although this disclosure describes and illustrates particular memory, this disclosure contemplates any suitable memory.

In particular embodiments, storage 306 includes mass storage for data or instructions. As an example and not by way of limitation, storage 306 may include a hard disk drive (HDD), a floppy disk drive, flash memory, an optical disc, a magneto-optical disc, magnetic tape, or a Universal Serial Bus (USB) drive or a combination of two or more of these. Storage 306 may include removable or non-removable (or fixed) media, where appropriate. Storage 306 may be internal or external to computer system 300, where appropriate. In particular embodiments, storage 306 is non-volatile, solid-state memory. In particular embodiments, storage 306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 306 taking any suitable physical form. Storage 306 may include one or more storage control units facilitating communication between processor 302 and storage 306, where appropriate. Where appropriate, storage 306 may include one or more storages 306. Although this disclosure describes and illustrates particular storage, this disclosure contemplates any suitable storage.

In particular embodiments, I/O interface 308 includes hardware, software, or both, providing one or more interfaces for communication between computer system 300 and one or more I/O devices. Computer system 300 may include one or more of these I/O devices, where appropriate. One or more of these I/O devices may enable communication between a person and computer system 300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 308 for them. Where appropriate, I/O interface 308 may include one or more device or software drivers enabling processor 302 to drive one or more of these I/O devices. I/O interface 308 may include one or more I/O interfaces 308, where appropriate. Although this disclosure describes and illustrates a particular I/O interface, this disclosure contemplates any suitable I/O interface.

In particular embodiments, communication interface 310 includes hardware, software, or both providing one or more interfaces for communication (such as, for example, packet-based communication) between computer system 300 and one or more other computer systems 300 or one or more networks. As an example and not by way of limitation, communication interface 310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 310 for it. As an example and not by way of limitation, computer system 300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 300 may include any suitable communication interface 310 for any of these networks, where appropriate. Communication interface 310 may include one or more communication interfaces 310, where appropriate. Although this disclosure describes and illustrates a particular communication interface, this disclosure contemplates any suitable communication interface.

In particular embodiments, bus 312 includes hardware, software, or both coupling components of computer system 300 to each other. As an example and not by way of limitation, bus 312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local bus (VLB), or another suitable bus or a combination of two or more of these. Bus 312 may include one or more buses 312, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein.

Modifications, additions, or omissions may be made to the elements shown in the figure above. The components of a device may be integrated or separated. Moreover, the functionality of a device may be performed by more, fewer, or other components. The components within a device may be communicatively coupled in any suitable manner. Functionality described herein may be performed by one device or distributed across multiple devices. In general, systems and/or components described in this disclosure as performing certain functionality may comprise non-transitory computer readable memory storing instructions and processing circuitry operable to execute the instructions to cause the system/component to perform the described functionality.

While several embodiments have been provided in the present disclosure, it should be understood that the disclosed systems and methods might be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry configured to execute program code stored in memory. The term unit may have conventional meaning in the field of electronics, electrical devices and/or electronic devices and may include, for example, electrical and/or electronic circuitry, devices, modules, processors, receivers, transmitters, memories, logic solid state and/or discrete devices, computer programs or instructions for carrying out respective tasks, procedures, computations, outputs, and/or displaying functions, and so on, as such as those that are described herein.

What is claimed is:

1. A system, comprising:
one or more processors; and
one or more computer-readable non-transitory storage media comprising instructions that, when executed by the one or more processors, cause one or more components of the system to perform operations comprising:
programming, using a Static Context Header Compression (SCHC) rules engine, a plurality of rules expressing a plurality of firewall decisions;
identifying, using the SCHC rules engine, one or more packets matching a rule, wherein the rule represents a compression format;
compressing the one or more packets in accordance with the compression format;
after compressing the one or more packets, selecting a firewall decision from the plurality of firewall decisions;
decompressing the one or more packets based on the compression format;
after decompressing the one or more packets, applying the firewall decision to the one or more packets, wherein:
applying the firewall decision comprises applying a tag associated with a firewall action to the one or more packets; and
the firewall action is associated with a route map, a punt decision, or a drop decision;
identifying the tag applied to the one or more packets; and
performing the firewall action on the one or more packets based on the identified tag, wherein the firewall action is performed by an external engine.

2. The system of claim 1, the plurality of rules comprising:
a first rule requiring the one or more packets to be tagged with the firewall action;
a second rule requiring a route map to be applied to the one or more packets such that the one or more packets are routed using a particular path in network;
a third rule requiring an access control list (ACL) to be enforced on the one or more packets; and
a fourth rule requiring the one or more packets to be dropped or punted.

3. The system of claim 1, the operations further comprising matching the compression format to bit patterns of the one or more packets.

4. The system of claim 1, the operations further comprising transmitting the one or more packets to an external engine.

5. A method, comprising:
programming, using a Static Context Header Compression (SCHC) rules engine, a plurality of rules expressing a plurality of firewall decisions;
identifying, using the SCHC rules engine, one or more packets matching a rule, wherein the rule represents a compression format;
compressing the one or more packets in accordance with the compression format;
after compressing the one or more packets, selecting a firewall decision from the plurality of firewall decisions;
decompressing the one or more packets based on the compression format;
after decompressing the one or more packets, applying the firewall decision to the one or more packets, wherein;
applying the firewall decision comprises applying a tag associated with a firewall action to the one or more packets; and
the firewall action is associated with a route map, a punt decision, or a drop decision;
identifying the tag applied to the one or more packets; and
performing the firewall action on the one or more packets based on the identified tag, wherein the firewall action is performed by an external engine.

6. The method of claim 5:
the plurality of rules comprising:
a first rule requiring the one or more packets to be tagged with the firewall action;
a second rule requiring a route map to be applied to the one or more packets such that the one or more packets are routed using a particular path in network;
a third rule requiring an access control list (ACL) to be enforced on the one or more packets; and
a fourth rule requiring the one or more packets to be dropped or punted.

7. The method of claim 5, the method further comprising matching the compression format to bit patterns of the one or more packets.

8. The method of claim 5, further comprising transmitting the one or more packets to an external engine.

9. One or more computer-readable non-transitory storage media embodying instructions that, when executed by a processor, cause performance of operations comprising:
programming, using a Static Context Header Compression (SCHC) rules engine, a plurality of rules expressing a plurality of firewall decisions;
identifying, using the SCHC rules engine, one or more packets matching a rule, wherein the rule represents a compression format;
compressing the one or more packets in accordance with the compression format;
after compressing the one or more packets, selecting a firewall decision from the plurality of firewall decisions;
decompressing the one or more packets based on the compression format;
after decompressing the one or more packets, applying the firewall decision to the one or more packets, wherein:
applying the firewall decision comprises applying a tag associated with a firewall action to the one or more packets; and
the firewall action is associated with a route map, a punt decision, or a drop decision;
identifying the tag applied to the one or more packets; and
performing the firewall action on the one or more packets based on the identified tag, wherein the firewall action is performed by an external engine.

10. The one or more computer-readable non-transitory storage media of claim 9, the plurality of rules comprising:
a first rule requiring the one or more packets to be tagged with the firewall action;
a second rule requiring a route map to be applied to the one or more packets such that the one or more packets are routed using a particular path in network;

a third rule requiring an access control list (ACL) to be enforced on the one or more packets; and a fourth rule requiring the one or more packets to be dropped or punted.

11. The one or more computer-readable non-transitory storage media of claim 9, the operations further comprising matching the compression format to bit patterns of the one or more packets.

* * * * *